United States Patent [19]
Provino et al.

[11] Patent Number: 5,355,498
[45] Date of Patent: Oct. 11, 1994

[54] METHOD AND APPARATUS FOR BOOTING A COMPUTER SYSTEM WITHOUT LOADING A DEVICE DRIVER INTO MEMORY

[75] Inventors: Joseph E. Provino, Cambridge; William F. Pittore, Lexington, both of Mass.

[73] Assignee: Sun Microsystems, Inc., Mountain View, Calif.

[21] Appl. No.: 113,959

[22] Filed: Aug. 30, 1993

Related U.S. Application Data

[63] Continuation of Ser. No. 842,007, Feb. 25, 1992, abandoned.

[51] Int. Cl.$^5$ .................................................. G06F 9/445
[52] U.S. Cl. .............................. 395/700; 364/DIG. 1; 364/280.2
[58] Field of Search ................... 395/700; 364/DIG. 1, 364/280.2

[56] References Cited

U.S. PATENT DOCUMENTS 4,403,303  9/1983  Howes et al. ...................... 364/900

OTHER PUBLICATIONS

"VAX/VMS Services for MS-DOS" Abrahams, A. Digital Technical Journal, No. 9, pp. 44–50, Jun. 1989.
SunOS 4.1 System and Network Manual, Chapter 8, Mar. 1990.
Software Practice & Experience, vol. 21, No. 4, Apr. 1991, Chichester, GB; pp. 375–390 XP147180 W. Wilson Ho et al.: "An Approach to Genuine Dynamic Linking", *abstract* *p. 379, line 35–p. 384, line 13; FIGS. 2,3.
Dr. Dobb's Journal of Software Tools, vol. 15, No. 5, May 1990, US; pp. 30–109 Gary Syck: "Dynamic Link Libraries for DOS", *p. 30, middle col. line 7–p. 32, left col., line 13* *p. 36, left col., line 10–p. 39, left col., line 1*.
Proceedings of the Spring 1990 EUUG Conference, Apr. 23, 1990, Munich, DE, pp. 133–138; Dieter Konnerth et al.: "Dynamic Driver Loading for Unix System V" *p. 133, line 27–line 32* *p. 135, line 8–line 40* *p. 136, line 1–line 39.
Firmware Structure, APDA draft Mar. 2, 1987, Chapter 8, "Card Firmware".
System Bios for IBM PCs, Compatibles, and EISA Computers, Phoenix Technologies Ltd., Addison Wesley, 2nd. ed, 1991, pp. 96–99.
SunOS 4.1 System and Network Administration Manual, Chapter 5, Section 1, Mar. 1990, pp. 5–1 to 5–10.
William N. Joy, "Installing and Operating 4.2BSD on the VAX", Jul. 21, 1983.

*Primary Examiner*—Gareth D. Shaw
*Assistant Examiner*—A. Katbab
*Attorney, Agent, or Firm*—Blakely Sokoloff Taylor & Zafman

[57] ABSTRACT

In a computer system, a system boot prom having a bootstrap program is provided for booting the computer system from a boot device having a boot program and an operating system. The bootstrap program is designed to create a boot prom interface through which the boot program uses to locate the device driver for loading the operating system from the boot device. As a result, the device driver for the boot device may be provided in the system boot prom or a third party boot prom, thereby allowing the computer system to be booted from either a standard or a third party boot device without requiring rebuilding of the system boot prom. Additionally, a boot program interface and stand-alone I/O library routines are provided to the boot program for a root executable segment of an operating system without the root file system and root device driver to use the boot program to load other relocatable segments of the operating system on an as needed basis until the root file system and root device driver are loaded, thereby allowing the computer system to be booted with such basic root executable segment of an operating system.

24 Claims, 6 Drawing Sheets

METHOD AND APPARATUS FOR BOOTING A COMPUTER SYSTEM WITHOUT LOADING A DEVICE DRIVER INTO MEMORY

This is a continuation of application Ser. No. 07/842.007 filed Feb. 25, 1992, now abandoned.

BACKGROUND OF THE INVENTION

1. Field of the Invention

The present invention relates to the field of computer systems and their operating systems, in particular, computer systems executing the UNIX ® system (UNIX ® is a registered trademark of UNIX System Laboratories, Inc.). More specifically, the present invention relates to booting up a computer system.

2. Background

Typically, during system start up, the central processing unit (CPU) of a computer system is given the start address of a bootstrap program in a boot prom. The CPU fetches the first instruction at the start address and starts executing the bootstrap program. The bootstrap program reads a boot program from the boot block of a boot device into memory and transfers control to the start address of the boot program. The boot program in turn loads the operating system from the boot device into memory and transfers control to the start address of the operating system. The operating system goes through initialization and starts execution.

The boot program loads the operating system from the boot device using a built-in device driver for the boot device in the boot prom. Thus, a third party vendor's device cannot be used as a boot device, unless the boot prom is rebuilt to specifically include a built-in driver for the third party vendor's device. To do so, special knowledge and skill are required. It is therefore desirable to have a method for booting up a computer system that supports third party boot devices, but without requiring the boot prom to be rebuilt.

In the case of the UNIX ® system, typically the boot program, after being loaded into memory from the boot block of the boot device and given control by the bootstrap program, loads the kernel of the UNIX ® system from the boot device into memory using a built-in device driver in the boot prom and transfers control to the start address of the kernel. The kernel goes through initialization and starts execution of the first process.

Traditionally, the kernel is pre-built as one executable image on the boot device. The single executable image kernel comprises the file subsystem, the device drivers and the process control subsystem. While the pre-built single executable image kernel may be reconfigured, typically special knowledge and skill are also required. Furthermore, the computer system has to be re-booted after reconfiguration. As a result, experience has shown that most UNIX ® systems use the generic kernel provided by the vendor, even though memory allocated to the functionalities that are never used are wasted.

Today, the kernel of some UNIX ® systems are dynamically configurable without requiring the computer system to be rebooted after reconfiguration. Under the fully dynamically reconfigurable UNIX ® system, the kernel's file subsystem, device drivers and process control subsystem are broken up into a root executable object and a number of other relocatable objects that are loadable and linkable dynamically. The root executable object is loaded into memory during system start up and the other relocatable objects are loaded into memory and dynamically linked only when their functionalities are needed. To minimize system start up time and memory requirement, the functions provided by the root executable segment are kept to the minimum. Therefore, it is further desirable for the method for booting up a computer system to support a single executable image kernel as well as a dynamically configurable kernel of the UNIX ® system.

As will be described, the desire to provide a method and apparatus for booting up a computer system from either a standard or a third party boot device without requiring the rebuilding of the system boot prom of the computer system, and the desire that the method and apparatus is applicable to a pre-built single executable image as well as a dynamically configurable operating system, in particular, the kernel of the UNIX ® system, are among the objects and desired results achieved by the present invention.

For further description of the UNIX ® system, the kernel and system boot, see M. J. Bach, *The Design of the UNIX ® Operating System*, Prentice Hall, 1986.

SUMMARY OF THE INVENTION

A method and apparatus for booting a computer system from either a standard or a third party boot device without requiring the rebuilding of the system boot prom of the computer system is disclosed. The method and apparatus has particular applications to a pre-built single executable image as well as a dynamically configurable operating system, including the kernel of the UNIX ® system.

Under the present invention, a system boot prom having a bootstrap program, a boot device having a boot program and an operating system, and device driver means having a device driver are provided to a computer system. The bootstrap program, the boot program and the device driver cooperate with each other through a boot prom interface, thereby allowing the device driver means to be provided in the system boot prom or a third party boot prom, and the computer system to be booted from either a standard or a third party boot device without requiring rebuilding of the system boot prom.

During system start up, the bootstrap program initializes the boot prom interface in memory, loads the boot program from the boot device into the memory, and transfers control to the boot program. The boot program is loaded from a boot block which is located in a predetermined location of the boot device. The boot program then updates the boot prom interface with a pointer pointing to the device driver, loads the pre-built single executable image or the root executable segment of the operating system using the device driver pointed to by the pointer, and transfers control to the operating system.

Additionally, under the preferred embodiment, a boot program interface and a plurality of input/output (I/O) library routines are also provided to the boot program for the root executable segment of the operating system to use to subsequently load other relocatable segments of the operating system from the boot device into the memory on an as needed basis. The I/O library routines use the device driver pointed to by the pointer in the boot prom interface to read the other relocatable segments of the operating system from the boot device. The root executable segment of the operating system uses the I/O library routines of the boot program to load the other relocatable segments of the operating system until the root file subsystem reader and root device driver are loaded into memory. As a result, the root file system and root device driver do not have to be included in the root executable segment of the operating system, thereby enabling the computer system to be booted up with such basic root executable segment of an operating system.

BRIEF DESCRIPTION OF THE DRAWINGS

The objects, features, and advantages of the present invention will be apparent from the following detailed description of the preferred embodiment of the invention with references to the drawings in which.

NOTATIONS AND NOMENCLATURE

The detailed description which follows is presented largely in terms of program procedures executed on a computer. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations, Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE PREFERRED EMBODIMENT

A method and apparatus for booting up a computer system from either a standard or a third party boot device without requiring rebuilding of the system boot prom of the computer system is disclosed. The method and apparatus has particular applications to pre-built single executable image as well as dynamically configurable operating system, including the kernel of the UNIX® system. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
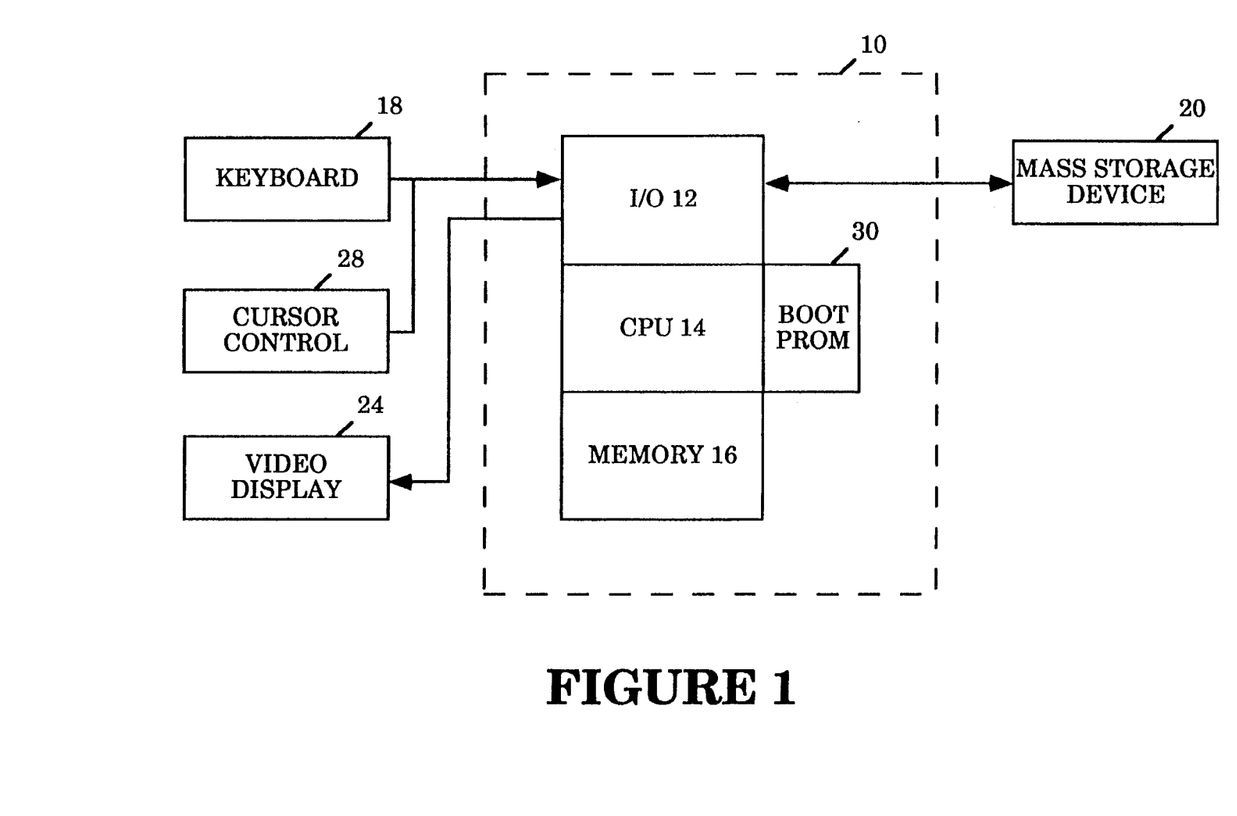
FIG. 1 shows a physical view of the hardware elements of a computer system that incorporates the teachings of the present invention.

Referring now to FIG. 1, a computer system that can be booted up from either a standard or third party boot device without requiring rebuilding the system boot prom in accordance with the teachings of the present invention is illustrated. Shown is a computer 10 which comprises three major components 12, 14, 16 and a system boot prom 30. The first of these is an input/output (I/O) circuit 12 which is used to communicate information in appropriately structured form to and from other portions of the computer 10. In addition, the computer 10 includes a central processing unit (CPU) 14 coupled to the I/O circuit 12, the system boot prom 30, and a memory 16. The system boot prom 30 will be described in further detail later. The I/O circuit 12, the CPU 14 and the memory 16 are those typically found in most general purpose computers.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14 in accordance to the teachings of the present invention. Any well known variety of raster displays may be utilized as display 24. A keyboard 18 is shown coupled to the I/O circuit 12 and is used to input data and commands into the computer 10, as is well known. A cursor control device 28 is also shown coupled to the computer 10 through the I/O circuit 12. Any well known variety of cursor control devices may be utilized as cursor control device 28.

Figure 2:
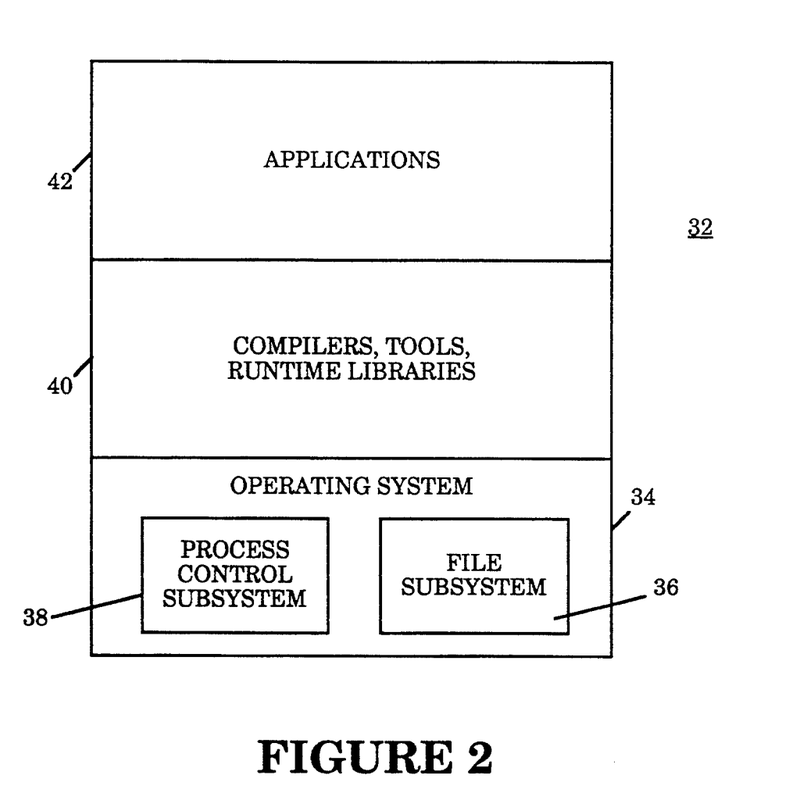
FIG. 2 shows a logical view of the software elements of the computer system illustrated in FIG. 1.

Referring now to FIG. 2, a block diagram illustrating a logical view of the software elements of the computer system illustrated in FIG. 1 after it has been booted up is shown. Shown is an operating system 34 comprising a file subsystem 36 and a process control subsystem 38. The file subsystem 36 is responsible for managing files, allocating file spaces, administering free space, controlling access to files and retrieving data from files. The process control subsystem 38 is responsible for process synchronization, interprocess communication, memory management and process scheduling.

In its presently preferred form, the operating system is dynamically configured. The dynamically configured operating system is intended to represent a broad category of dynamically configured operating systems. The program structure of the operating system will be described in further detail below with references to FIG. 3. However, it will be appreciated that the operating system may be statically configured as a pre-built single executable image.

Also shown are programming language compilers, software tools/utilities and their runtime libraries 40 for application development and execution. The applications 42 executing on the computer system utilize the underlying system services offered by runtime libraries 40 and the operating system 34. These software elements are those typically found in most general purpose computer systems and almost all special purpose computer systems.

Figure 3:
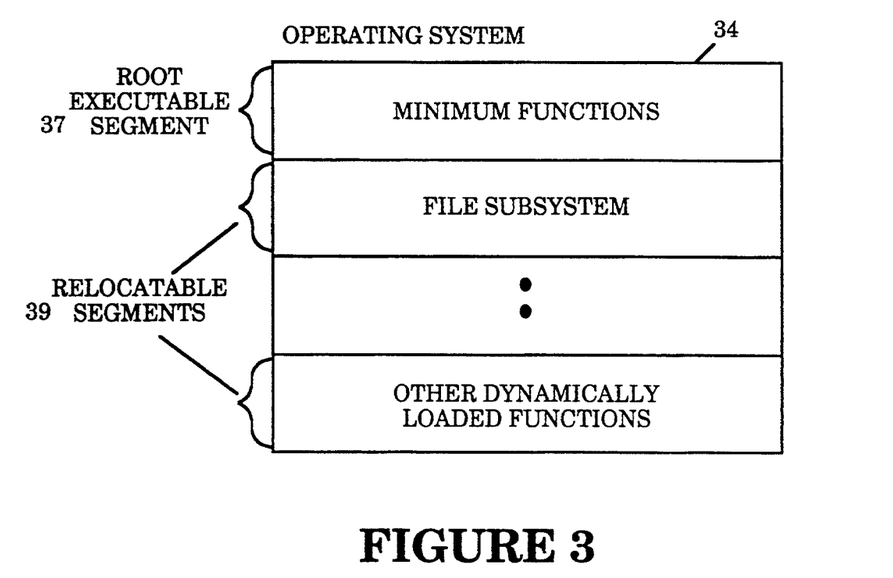
FIG. 3 shows a logical view of the program segment structure of the operating system illustrated in FIG. 2.

Referring now to FIG. 3, a block diagram illustrating a logical view of the program structure of the operating system illustrated in FIG. 2 is shown. Shown is a root executable segment 37 of the operating system 34 comprising the minimum set of functions provided by the operating system 34. The root executable segment 37 is loaded during system start up. Also shown is a number of relocatable segments 39 comprising the file subsystem functions and other functions provided by the operating system 34. Each of the relocatable segments 39 is dynamically loaded and linked on an as needed basis.

Figure 4:
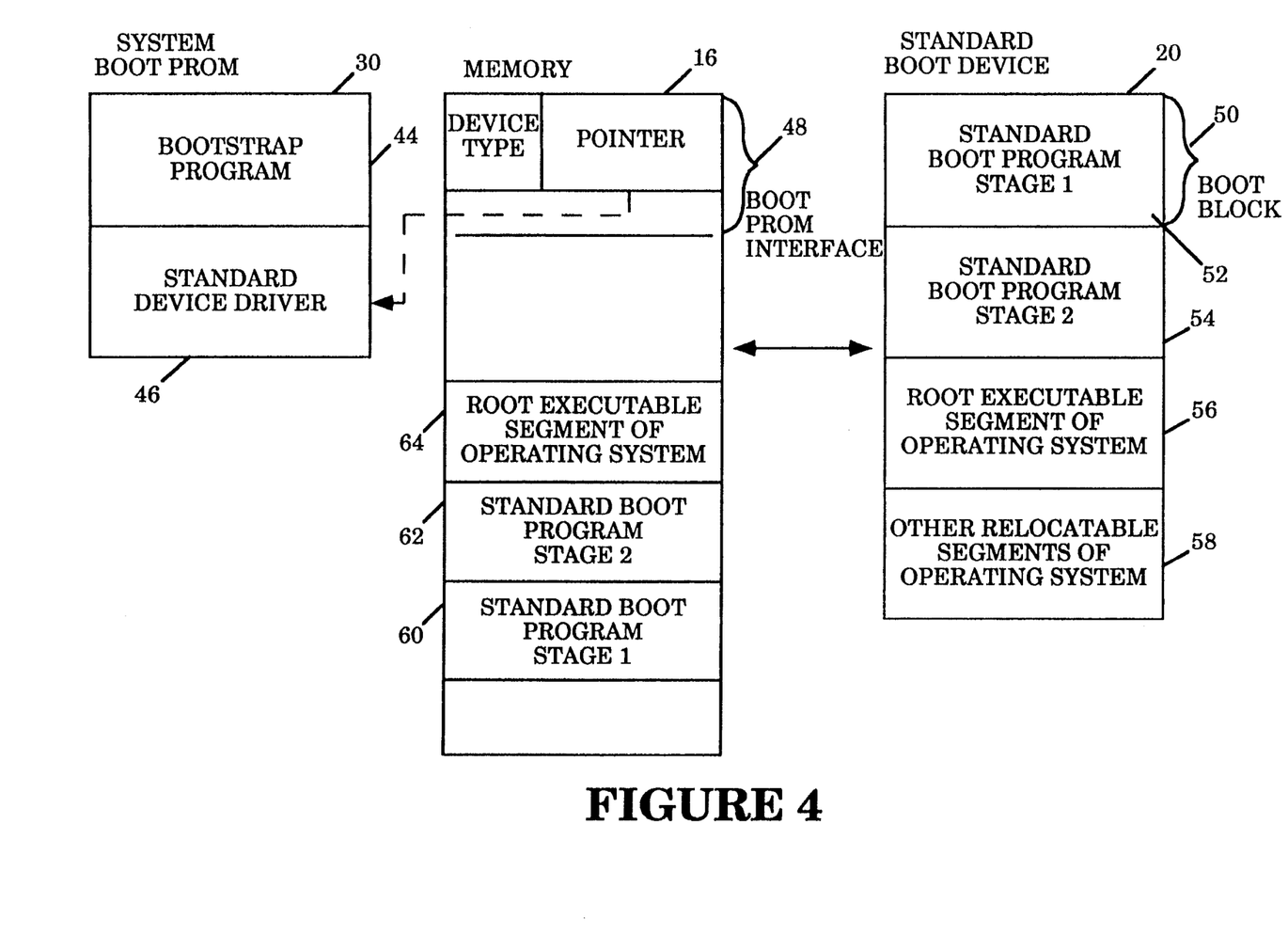
FIG. 4 illustrates the system boot prom, the boot prom interface, and a two stage standard boot program of the present invention in their presently preferred form for booting the computer system illustrated in FIG. 1 from a standard boot device.

Referring now to FIG. 4, a block diagram illustrating the system boot prom, the boot prom interface and a two stage standard boot program of the present invention in its presently preferred form for booting the computer system illustrated in FIG. 1 from a standard boot device is shown. Shown is a standard boot device 20 comprising a standard boot program having stages one and two, 52 and 54, and the dynamically configurable operating system illustrated in FIGS. 2 and 3. Stage one of the standard boot program 52 is located in a boot block 50 which is located in predetermined locations of the standard boot device 20, sectors two through sixteen under the presently preferred embodiment (sector one being used for storing the device label). While the presently preferred embodiment of the standard boot program 52 and 54 shown in FIG. 3 comprises stages one 52 and two 54, it will be appreciated that stages one 52 and two 54 may be combined together provided that a larger boot block 50 sufficient to store the single stage boot program is used.

Continuing to refer to FIG. 4, also shown is a system boot prom 30 comprising a bootstrap program 44. The bootstrap program 44 is given control during standard system start up. The bootstrap program 44 is used to initialize a boot prom interface 48 in memory 16, loads stage one of the standard boot program 52 from the standard boot device 20 into memory 16, and transfers control to stage one of the standard boot program 60 in memory during standard system start up. The bootstrap program 44 may be in executable form or self-configuring or both. Under the presently preferred embodiment, the boot prom interface 48 is initialized in the highest memory locations, and stage one of the standard boot program 60 is loaded into a predetermined area of low memory.

The system boot prom 30 further comprises a standard device driver 46 for reading data off the standard boot device 20. The standard device driver 46 controls operations of the standard boot device 20 including mapping logical addresses to physical addresses and reading data off the physical locations of the standard boot device 20. The standard device driver 46 also controls operations of other devices (not shown) that are of the same device type as the standard boot device 20. Additionally, while only one standard device driver 46 is illustrated in FIG. 4, it will be appreciated that the system boot prom 30 may comprise additional device drivers for controlling devices of other device types and using these devices as standard boot devices for booting the computer system.

Under the presently preferred embodiment, after stage one of the standard boot program 60 has been loaded into memory, bootstrap program 44 updates the boot prom interface 48 with a pointer pointing to the standard device driver 46 for controlling the standard boot device 20. Additionally, stage one of the standard boot program 60 loads stage two of the standard boot program 54 from the standard boot device 20 using the standard device driver 46 pointed to by the pointer in the boot prom interface 48, and transfers control to stage two of the standard boot program 62 in memory 16. Stage two of the standard boot program 62 is also loaded into a predetermined area of low memory above the memory locations occupied by stage one of the standard boot program 60.

Stage two of the standard boot program 62 then loads the root executable segment of the operating system 56 from the standard boot device into memory locations above the memory locations occupied by stages one and two of the standard boot program 60 and 62, using the standard device driver 46 pointed to by the pointer in the boot prom interface 48, and transfers control to the root executable segment of the operating system 64 in memory 16. When the root executable segment of the operating system 64 gets control, the computer system is up and running under the control of the operating system. The other relocatable segments of the operating system 58 are loaded on an as needed basis.

While under the presently preferred embodiment, stages one and two of the standard boot program 60 and 62 are loaded into low memory and the root executable segment of the operating system 64 is loaded into memory locations above the memory locations occupied by stages one and two of the standard boot program 52 and 54, it will be appreciated that different memory locations may be used for loading stages one 60 and two 62, and the root executable segment of the operating system 64.

Figure 5:
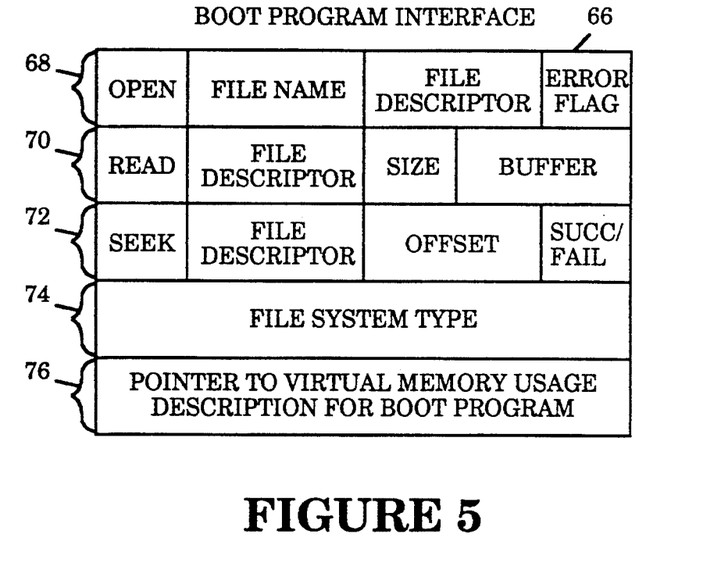
FIG. 5 illustrates the boot program interface of stage two of a standard boot program of the present invention in its presently preferred form.
Figure 6:
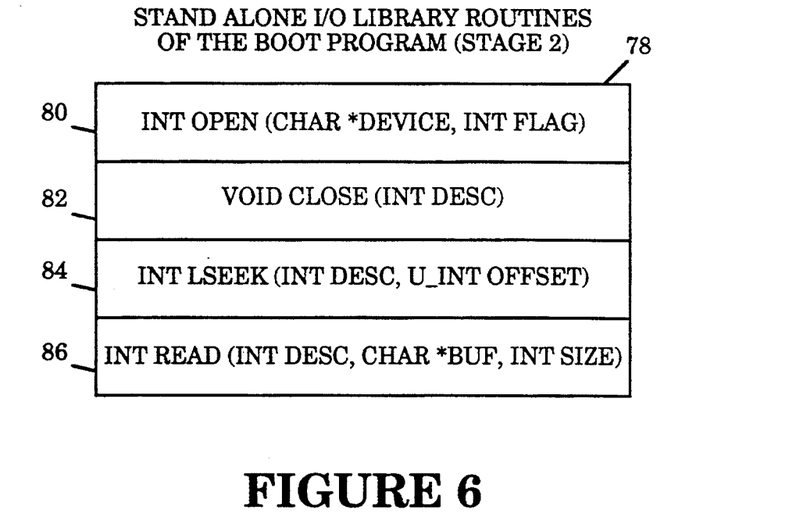
FIG. 6 illustrates the stand-alone input/output (I/O) library routines of stage two of a standard boot program of the present invention in its presently preferred form.

Referring now to FIGS. 5 and 6, two block diagrams, illustrating the boot program interface and the stand-alone I/O library routines of the standard boot program of the present invention in their presently preferred form are shown. Under the presently preferred embodiment, stage two of the standard boot program 54 or 62 further comprises a boot program interface 66 and a plurality of stand-alone input/output (I/O) library routines 78 for the root executable segment of the operating system to use to load the other relocatable segments of the operating system until the root file subsystem and the root device driver of the operating system are loaded into memory 16, thereby removing the need to include the root file subsystem and the root device driver in the root executable segment. The stand-alone I/O library routines 78 in turn use the standard device driver pointed to by the pointer in the boot prom interface (see FIG. 4) to load the relocatable segments of the operating system from the standard boot device into memory.

As shown in FIG. 5, the boot program interface 66 comprises an open interface area 68, a read interface area 70, a relative positioning interface area 72, a filesystem type interface area 74 and a virtual memory usage interface area 76. The open interface area 68, the read interface area 70, and the relative positioning interface area 72 are used by the root executable segment of the operating system to invoke an open, a read, and a relative position routine of the stand-alone I/O library routines 78 of stage two of the standard boot program respectively. The filesystem type interface area 74 is used to indicate the filesystem type, and the virtual memory usage interface area 76 is used to point to the virtual memory usage description for stage two of the standard boot program.

As shown in FIG. 6, the stand-alone I/O library routines 78 comprise an boot device routine 80, a close boot device routine 82, a boot device relative positioning routine 84 and a read boot device routine 86. The boot device routine 80 is used to open the standard boot device and return a descriptor for the standard boot device or an error indicator if the standard boot device cannot be open. The close boot device routine 82 is used to close the standard boot device identified by the boot device descriptor. The boot device relatively positioning routine 84 is used to position the next read position at an offset into the standard boot device. The read boot device routine 86 is used to read a number of bytes off the standard boot device or return an error indicator if the number of bytes cannot be read off the standard boot device.

Figure 7:
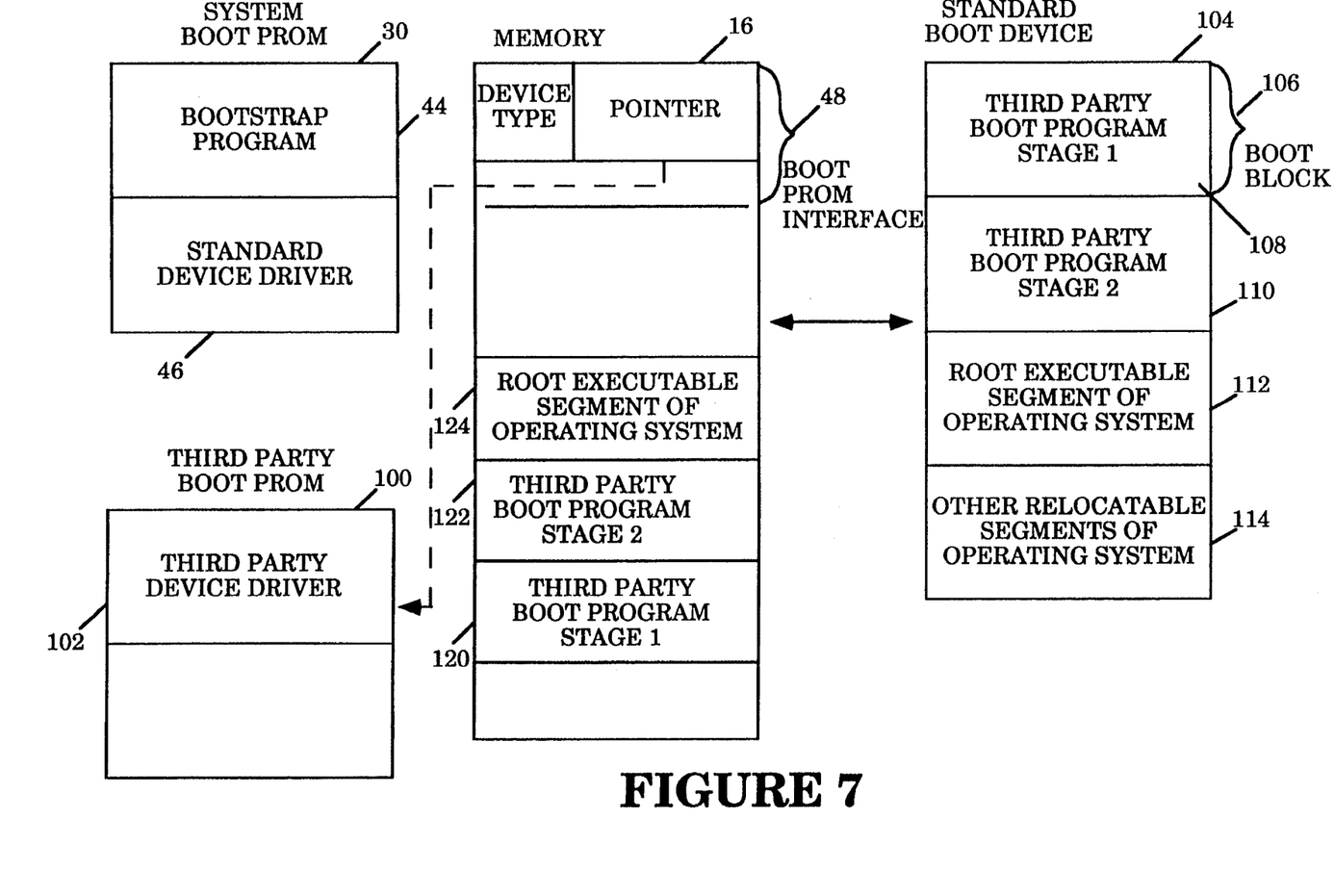
FIG. 7 illustrates similarly constituted third party boot prom and third party boot program cooperating with the system boot prom and the boot prom interface of the present invention for booting the computer system illustrated in FIG. 1 from a third party boot device without requiring rebuilding of the system boot prom.

Referring now to FIG. 7, a block diagram illustrating similarly constituted third party boot prom and third party boot program cooperating with the system boot prom and the boot prom interface of the present invention for booting the computer system illustrated in FIG. 1 using a third party boot device without requiring rebuilding of the system boot prom is shown. Shown is a third party boot device 104 having a device type not supported by any of the standard device drivers of the computer system. Similar to a standard boot device, the third party boot device 104 comprises a similarly constituted third party boot program having stages one and two, 108 and 110, and a dynamically configurable operating system having a root executable segment 112 and other relocatable segments 114. Stage one of the third party boot program 108 is located in a boot block 106 which is located in predetermined locations of the third party boot device 104, sectors two through sixteen under the presently preferred embodiment (sector one being used for storing the device label).

Similarly, while the similarly constituted third party boot program 108 and 110 shown in FIG. 7 comprises stages one 108 and two 110, it will be appreciated that stages one 108 and two 110 may also be combined together provided that a larger boot block 106 sufficient to store the single stage third party boot program is used. Likewise, while the operating system 112 and 114 on the third party boot device 100 shown in FIG. 7 is dynamically configurable comprising a root executable segment 112 and a number of other relocatable segments 114, it will be appreciated that the other relocatable segments 114 may also be statically linked with the root executable segment 112 to form a single executable image.

Continuing to refer to FIG. 7, also shown is the system boot prom 30 comprises the bootstrap program 44. As described earlier, the bootstrap program 44 is given control during standard system start up. The bootstrap program 44 initializes the boot prom interface 48 in memory 16, loads stage one of the third party boot program 108 from the third party boot device 104 into memory 16, and transfer control to stage one of the third party boot program 120 in memory during system start up using the third party boot device 104. The boot prom interface 48 is initialized in the highest memory locations, and stage one of the third party boot program 108 is loaded into a predetermined area of low memory.

Also shown is the third party boot prom 100 comprising a third party device driver 102 for reading data off the third party boot device 104. Similarly, the third party device driver 102 controls operations of the third party boot device 104 including mapping logical addresses to physical addresses and reading data off the physical locations of the third party boot device 104. The third party device driver 102 also controls operations of other devices (not shown) that are of the same device type as the third party boot device 104. Additionally, while only one third party device driver 102 is illustrated in FIG. 7, it will be appreciated that the third party boot prom 100 may comprise additional third party device drivers for controlling devices of other device types and using these devices as third party boot devices for booting the computer system.

Being similarly constituted as the standard boot program, after stage one of the third party boot program 120 has been loaded into memory, bootstrap program 44 updates the boot prom interface 48 with a pointer pointing to the third party device driver 102 for controlling the third party boot device 104. Additionally, stage one of the third party boot program 108 loads stage two of the third party boot program 110 from the third party boot device 104 using the third party device driver 102 pointed to by the pointer in the boot prom interface 48, and transfers control to stage two of the third party boot program 122 in memory 16. Stage two of the third party boot program 122 is also loaded into a predetermined area of low memory above the memory locations occupied by stage one of the third party boot program 120.

Stage two of the third party boot program 124 then loads the root executable segment of the operating system 112 from the third party boot device 104 into memory locations above the memory locations occupied by stages one and two of the third party boot program 120 and 122, using the third party device driver 102 pointed to by the pointer in the boot prom interface 48, and transfers control to the root executable segment of the operating system 124 in memory 16. When the root executable segment of the operating system 124 gets control, the computer system is up and running under the control of the operating system, which is loaded into memory 16 from a third party boot device 104 without requiring rebuilding of the system prom 30. Similar to standard system start up, the other relocatable segments of the operating system 114 are loaded on an as needed basis.

Similarly, while stages one and two of the similarly constituted boot program 120 and 122 are loaded into low memory and the root executable segment of the operating system 124 is loaded into memory locations above the memory locations occupied by stages one and two of the third party boot program 120 and 122, it will be appreciated that different memory locations may be used for loading stages one 120 and two 122, and the root executable segment of the operating system 124.

Likewise, being similarly constituted as the standard boot program, stage two of the third party boot program 110 or 122 further comprises a boot program interface and a plurality of stand-alone input/output (I/O) library routines for the root executable segment of the operating system to use to load the other relocatable segments of the operating system until the root file subsystem and the root device driver of the operating system are loaded into memory 16, thereby removing the need to include the root file subsystem and the root device driver in the root executable segment. The stand-alone I/O library routines in turn use the third party device driver 102 pointed to by the pointer in the boot prom interface to load the relocatable segments of the operating system 114 from the third party boot device 104 into memory 16.

Figure 8:
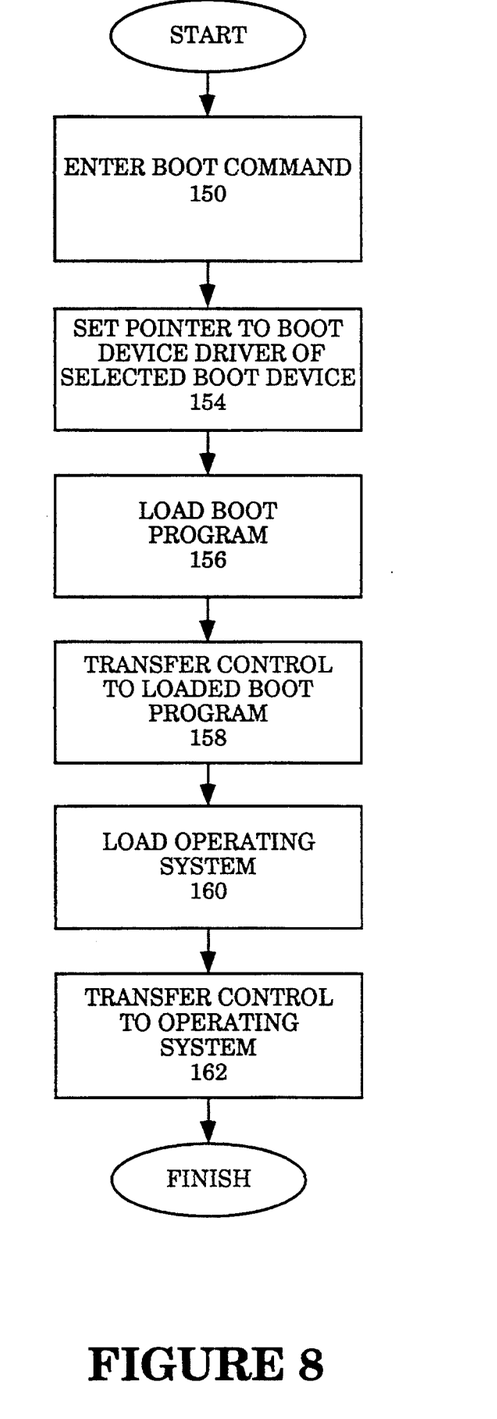
FIG. 8 illustrates a flow chart of the steps of the method of the present invention.

FIG. 8 depicts a flow chart of the steps of the method of the present invention. The method begins in process block 150 with the user entering a boot command through an input device. The boot command is for initiating the booting of the computer system by giving to the CPU, during system start up, a start address Of a bootstrap program residing in the boot prom. The CPU then fetching an initial instruction of the bootstrap program from the Start address and thereby beginning execution of the bootstrap program. Then, in process block 152, the bootstrap program initializes a boot prom interface in the computer memory by setting a pointer in said boot prom interface to point to a device driver residing in said boot prom. The boot device driver is located in the system boot prom if a system boot device is being used and in a third party boot prom if a third party boot device is being used. Then, in process block 156, the bootstrap program loads the boot program from a predetermined boot area of the boot device into the memory. Next, in process block 158, control is transferred to said loaded boot program. Then, in process block 160 the loaded boot program loads an operating system comprising at least a root executable segment from the boot device into the memory. The boot program uses the boot device driver pointed to by the pointer. Finally, in process block 162, control is transferred to the loaded root executable segment of the operating system and the system boot is complete.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is

1. In a computer system comprising a central processing unit (CPU), a boot device, a boot prom and a main memory, the CPU being coupled to the boot device, the boot prom and the memory, a method for booting said computer system to a root executable segment of an operating system without requiring loading of a device driver for the boot device into the main memory, said method comprising the steps of:

during system start up, giving to the CPU a start address of a bootstrap program residing in the boot prom;

the CPU fetching an initial instruction of the bootstrap program from the start address and thereby beginning execution of the bootstrap program;

the bootstrap program initializing a boot prom interface in said memory by setting a pointer in said boot prom interface to point to a device driver residing in said boot prom;

the bootstrap program loading a boot program from said boot device into said memory using said device driver; the bootstrap program transferring control to said loaded boot program;

said loaded boot program using said device driver pointed to by said pointer in said boot prom interface to load the root executable segment from said boot device into said memory, said boot program having a file subsystem reader interface for said root executable segment of said operating system to load other relocatable segments of said operating system; and said loaded boot program transferring control to said loaded root executable segment of said operating system, said root executable segment using said boot program to load said other relocatable segments until a root file subsystem and a root device driver is loaded.

2. The method as set forth in claim 1, wherein, said boot program comprises a stage one and a stage two, said stage one being loaded into said memory by said bootstrap program from a boot block which is located in a predetermined location of said boot device, said stage two being loaded into said memory by said stage one from said boot device.

3. The method as set forth in claim 1, wherein, said boot program is a file subsystem reader comprising a plurality of stand-alone input/output (I/O) library routines that use said device driver for reading said operating system from said boot device, said I/O library routines using said boot prom interface to locate said device driver.

4. The method as set forth in claim 3, wherein, said plurality of stand-alone I/O library routines comprise an open boot device routine, a close boot device routine, a boot device relative positioning routine, and a read boot device routine.

5. The method as set forth in claim 1, wherein, said file subsystem reader interface comprises an open boot device interface area, a read boot device interface area, and a boot device relative positioning interface area.

6. The method as set forth in claim 1, wherein, said operating system further comprises other executable segments statically linked with said root executable segment forming a single executable image.

7. In a computer system comprising a central processing unit (CPU) coupled to a main memory, an apparatus for booting said computer system said boot device coupled to said CPU, said boot device having said boot program and said operating system, said operating system having at least said root executable segment, said boot program being located in a predetermined location of said boot device and having a file subsystem reader interface for said root executable segment of said operating system to load other relocatable segments of said operating system;

a boot prom coupled to said CPU, the boot prom having the device driver and a bootstrap program resident; and an input device coupled to said CPU for providing to the CPU a start address of a bootstrap program during system start up, the CPU fetching an initial instruction of the bootstrap program from the start address and thereby beginning execution of the bootstrap program, the bootstrap program initializing a boot prom interface in said memory by setting a pointer in said boot prom interface to point to said device driver, the bootstrap program loading said boot program from said boot device into said memory using said device driver, the bootstrap program transferring control to said loaded boot program, said loaded boot program using said device driver pointed to by said pointer in said boot prom interface to load the root executable segment from said boot device into said memory, and said loaded boot program transferring control to said loaded root executable segment of said operating system, said root executable segment using said boot program to load said other relocatable segments until a root file subsystem and a root device driver is loaded.

8. The apparatus as set forth in claim 7, wherein, said boot program comprises a stage one and a stage two, said stage one being loaded into said memory by said bootstrap program from a boot block which is located in a predetermined location of said boot device, said stage two being loaded into said memory by said stage one from said boot device.

9. The apparatus as set forth in claim 7, wherein, said boot program is a file subsystem reader comprising a plurality of stand-alone input/output (I/O) library routines that use said device driver for reading said operating system from said boot device, said I/O library routines using said boot prom interface to locate said device driver.

10. The apparatus as set forth in claim 9, Wherein, said plurality of stand-alone I/O library routines comprise an:boot device routine, a close boot device routine, a boot device relative positioning routine, and a read boot device routine.

11. The apparatus as set forth in claim 8, wherein, said file subsystem reader interface comprises an open boot device interface area, a read boot device interface area, and a boot device relative positioning interface area.

12. The apparatus as set forth in claim 7, wherein, said operating system further comprises other executable segments statically linked with said root executable segment to form a single executable image.

13. In a computer system comprising a central processing unit (CPU), a boot device, a boot prom, a device driver prom and a main memory, the CPU being coupled to the boot device, the boot prom, the device driver prom and the memory, a method for booting said computer system to a root executable segment of an operating system without requiring loading of a device driver for the boot device into the main memory, said method comprising the steps of:

during system start up, giving to the CPU a start address of a bootstrap program residing in the boot prom;

the CPU fetching an initial instruction of the bootstrap program from the start address and thereby beginning execution of the bootstrap program;

the bootstrap program initializing a boot prom interface in said memory by setting a pointer in said boot prom interface to point to a device driver residing in said device driver prom;

the bootstrap program loading a boot program from said boot device into said memory using said device driver;

the bootstrap program transferring control to said loaded boot program;

said loaded boot program using said device driver pointed to by said pointer in said boot prom interface to load the root executable segment from said boot device into said memory, said boot program having a file subsystem reader interface for said root executable segment of said operating system to load other relocatable segments of said operating system; and said loaded boot program transferring control to said loaded root executable segment of said operating system, said root executable segment using said boot program to load said other relocatable segments until a root file subsystem and a root device driver is loaded.

14. The method as set forth in claim 13, wherein, said boot program comprises a stage one and a stage two, said stage one being loaded into said memory by said bootstrap program from a boot block which is located in a predetermined location of said boot device, said stage two being loaded into said memory by said stage one from said boot device.

15. The method as set forth in claim 13, wherein, said boot program is a file subsystem reader comprising a plurality of stand-alone input/output (I/O) library routines that use said device driver for reading said operating system from said boot device, said I/O library routines using said boot prom interface to locate said device driver.

16. The method as set forth in claim 15, wherein, said plurality of stand-alone I/O library routines comprise an open boot device routine, a close boot device routine, a boot device relative positioning routine, and a read boot device routine.

17. The method as set forth in claim 13, wherein, said file subsystem reader interface comprises an open boot device interface area, a read boot device interface area, and a boot device relative positioning interface area.

18. The method as set forth in claim 13, wherein, said operating system further comprises other executable segments statically linked with said root executable segment forming a single executable image.

19. In a computer system comprising a central processing unit (CPU) coupled to a main memory, an apparatus for booting said computer system to a root executable segment of an operating system without requiring loading of a device driver for a boot device into the main memory, said apparatus comprising:

said boot device coupled to said CPU, said boot device having said boot program and said operating system, said operating system having at least said root executable segment, said boot program being located in a predetermined location of said boot device and having a file subsystem reader interface for said root executable segment of said operating system to load other relocatable segments of said operating system;

a device driver prom coupled to said CPU, said device driver prom having the device driver resident;

a boot prom coupled to said CPU, the boot prom having a bootstrap program resident; and an input device coupled to said CPU for providing to the CPU a start address of the bootstrap program during system start up, the CPU fetching an initial instruction of the bootstrap program from the start address and thereby beginning execution of the bootstrap program, the bootstrap program initializing a boot prom interface in said memory by setting a pointer in said boot prom interface to point to said device driver, the bootstrap program loading said boot program from said boot device into said memory using said device driver, the bootstrap program transferring control to said loaded boot program, said loaded boot program using said device driver pointed to by said pointer in said boot prom interface to load the root executable segment from said boot device into said memory, and said loaded boot program transferring control to said loaded root executable segment of said operating system, said root executable segment using said boot program to load said other relocatable segments until a root file subsystem and a root device driver is loaded.

20. The apparatus as set forth in claim 19, wherein, said boot program comprises a stage one and a stage two, said stage one being loaded into said memory by said bootstrap program from a boot block which is located in a predetermined location of said boot device, said stage two being loaded into said memory by said stage one from said boot device.

21. The apparatus as set forth in claim 19, wherein, said boot program is a file subsystem reader comprising a plurality of stand-alone input/output (I/O) library routines that use said device driver for reading said operating system from said boot device, said I/O library routines using said boot prom interface to locate said device driver.

22. The apparatus as set forth in claim 21, wherein, said plurality of stand-alone I/O library routines comprise an open boot device routine, a close boot device routine, a boot device relative positioning routine, and a read boot device routine.

23. The apparatus as set forth in claim 19, wherein, said file subsystem reader interface comprises an open boot device interface area, a read boot device interface area, and a boot device relative positioning interface area.

24. The apparatus as set forth in claim 19, wherein, said operating system further comprises other executable segments statically linked with said root executable segment to form a single executable image.

* * * * *

UNITED STATES PATENT AND TRADEMARK OFFICE
CERTIFICATE OF CORRECTION

PATENT NO. : 5,355,498
DATED : October 11, 1994
INVENTOR(S) : Provino et al.

It is certified that error appears in the above-identified patent and that said Letters Patent is hereby corrected as shown below:

In column 11, claim 7 at line 9, please delete " system " and insert -- system to a root executable segment of an operating system without requiring loading of a device driver for a boot device into the main memory, said apparatus comprising: --.

In column 11, claim 10 at line 58, please delete " Wherein " and insert -- wherein --.

In column 11, claim 13 at line 63, please delete " claim 8 " and insert -- claim 7 --.

Signed and Sealed this

Eighth Day of September, 1998

Attest:

BRUCE LEHMAN

Attesting Officer

Commissioner of Patents and Trademarks